United States Patent
Jacoby et al.

(10) Patent No.: US 9,317,349 B2
(45) Date of Patent: Apr. 19, 2016

(54) SAN VULNERABILITY ASSESSMENT TOOL

(71) Applicant: Dell Products, LP, Round Rock, TX (US)

(72) Inventors: Robert B. Jacoby, Merrimack, NH (US); Bernard Abraham Rozmovits, Milford, NH (US)

(73) Assignee: Dell Products, LP, Round Rock, TX (US)

( * ) Notice: Subject to any disclaimer, the term of this patent is extended or adjusted under 35 U.S.C. 154(b) by 121 days.

(21) Appl. No.: 14/065,825

(22) Filed: Oct. 29, 2013

(65) Prior Publication Data

US 2015/0074468 A1 Mar. 12, 2015

Related U.S. Application Data

(63) Continuation-in-part of application No. 14/024,454, filed on Sep. 11, 2013.

(51) Int. Cl.
*G06F 11/00* (2006.01)
*G06F 11/34* (2006.01)

(52) U.S. Cl.
CPC .......... *G06F 11/008* (2013.01); *G06F 11/3485* (2013.01)

(58) Field of Classification Search
CPC . G06F 11/07; G06F 11/2056; G06F 11/3409; G06F 11/3495; G06F 11/3055; G06F 11/0748
USPC ...................................................... 714/47.03
See application file for complete search history.

(56) References Cited

U.S. PATENT DOCUMENTS

| | | | |
|---|---|---|---|
| 5,084,819 A | * | 1/1992 | Dewey .................. G09B 19/00 434/212 |
| 5,828,583 A | | 10/1998 | Bush et al. |
| 6,148,335 A | | 11/2000 | Haggard et al. |
| 6,189,084 B1 | | 2/2001 | Kurisu |
| 6,408,406 B1 | | 6/2002 | Parris |
| 6,415,189 B1 | | 7/2002 | Hajji |
| 6,434,714 B1 | | 8/2002 | Lewis et al. |
| 6,467,054 B1 | | 10/2002 | Lenny |
| 6,771,440 B2 | | 8/2004 | Smith |
| 6,845,306 B2 | * | 1/2005 | Henry .................. B64D 41/00 701/29.6 |
| 7,136,768 B1 | | 11/2006 | Shah et al. |

(Continued)

OTHER PUBLICATIONS

Pinheiro, E., et al., "Failure Trends in a Large Disk Drive Population," *Proceedings of the 5th USENIX Conference on File and Storage Technologies (FAST'07)*, (Feb. 2007).

(Continued)

*Primary Examiner* — Amine Riad
(74) *Attorney, Agent, or Firm* — Hamilton, Brook, Smith & Reynolds, P.C.

(57) ABSTRACT

The invention pertains to a method and information handling system (IHS) for assessing storage device vulnerability to data unavailability or data loss. An embodiment of the method of the present invention begins by obtaining data regarding static and dynamic factors of the at least one storage device. Next, based on the obtained data, a risk score is calculated for the at least one storage device. Finally, using the obtained data, the risk score is presented to a user. In another example embodiment, a risk score indicator is associated with the at least one storage device based upon the calculated risk score.

20 Claims, 7 Drawing Sheets

(56) References Cited

U.S. PATENT DOCUMENTS

| | | | |
|---|---|---|---|
| 7,236,911 B1 | 6/2007 | Gough et al. | |
| 7,278,057 B2 | 10/2007 | Betancourt et al. | |
| 7,302,617 B2* | 11/2007 | Wookey | G06F 11/008 714/38.14 |
| 7,373,559 B2* | 5/2008 | Guha | 714/54 |
| 7,409,582 B2* | 8/2008 | McNeill et al. | 714/6.2 |
| 7,434,097 B2 | 10/2008 | Guha et al. | |
| 7,490,073 B1 | 2/2009 | Qureshi et al. | |
| 7,539,907 B1* | 5/2009 | Johnsen | G06F 11/008 714/26 |
| 7,653,563 B2* | 1/2010 | Veeningen et al. | 705/7.28 |
| 7,676,445 B2* | 3/2010 | Fry | G06F 11/008 706/52 |
| 7,877,645 B2* | 1/2011 | Meyer | G06F 11/008 714/47.3 |
| 7,908,526 B2 | 3/2011 | Guha | |
| 8,005,709 B2 | 8/2011 | King et al. | |
| 8,073,821 B2 | 12/2011 | Zahavi et al. | |
| 8,086,893 B1 | 12/2011 | MacFarland et al. | |
| 8,103,463 B2* | 1/2012 | Kalgren | G01D 3/08 702/117 |
| 8,136,124 B2 | 3/2012 | Kosche et al. | |
| 8,185,784 B2 | 5/2012 | McCombs et al. | |
| 8,315,991 B2 | 11/2012 | Mandagere et al. | |
| 8,316,263 B1 | 11/2012 | Gough et al. | |
| 8,386,889 B1 | 2/2013 | Tang et al. | |
| 8,760,780 B1* | 6/2014 | Brooker | G11B 27/36 360/31 |
| 8,782,491 B2* | 7/2014 | Resch et al. | 714/764 |
| 8,856,927 B1 | 10/2014 | Beloussov et al. | |
| 8,862,948 B1* | 10/2014 | Lam | 714/47.3 |
| 8,880,801 B1 | 11/2014 | Robins et al. | |
| 8,904,144 B1* | 12/2014 | Chelur | 711/172 |
| 8,909,990 B2 | 12/2014 | Davis et al. | |
| 8,949,672 B1 | 2/2015 | Srihamat et al. | |
| 8,949,863 B1 | 2/2015 | Coatney et al. | |
| 8,972,799 B1* | 3/2015 | Brooker et al. | 714/47.2 |
| 9,037,921 B1* | 5/2015 | Brooker et al. | 714/47.1 |
| 9,084,937 B2* | 7/2015 | Gadher | G06F 11/008 |
| 9,189,309 B1* | 11/2015 | Ma | G06F 11/008 |
| 2002/0087950 A1 | 7/2002 | Brodeur et al. | |
| 2003/0112538 A1 | 6/2003 | Smith | |
| 2003/0204788 A1 | 10/2003 | Smith | |
| 2004/0205403 A1 | 10/2004 | Markow et al. | |
| 2004/0260967 A1* | 12/2004 | Guha | G06F 11/008 714/3 |
| 2005/0265160 A1* | 12/2005 | Sasaki | G11B 27/34 369/47.1 |
| 2006/0047715 A1 | 3/2006 | Parizeau | |
| 2006/0053338 A1 | 3/2006 | Cousins et al. | |
| 2006/0075189 A1 | 4/2006 | Hood et al. | |
| 2006/0090098 A1 | 4/2006 | Le et al. | |
| 2008/0059292 A1 | 3/2008 | Myers | |
| 2008/0209274 A1 | 8/2008 | Nicholson et al. | |
| 2009/0204852 A1* | 8/2009 | Diggs et al. | 714/42 |
| 2009/0259749 A1 | 10/2009 | Barrett et al. | |
| 2009/0279673 A1 | 11/2009 | Maffre et al. | |
| 2010/0023867 A1 | 1/2010 | Coldiron et al. | |
| 2010/0324945 A1* | 12/2010 | Hessing | G06Q 40/08 705/4 |
| 2012/0066030 A1 | 3/2012 | Limpert | |
| 2012/0136985 A1 | 5/2012 | Popescu et al. | |
| 2012/0179936 A1 | 7/2012 | Masser et al. | |
| 2013/0091499 A1 | 4/2013 | Soundararajan et al. | |
| 2014/0019194 A1* | 1/2014 | Anne | 705/7.28 |
| 2014/0040897 A1 | 2/2014 | Davis et al. | |
| 2014/0108855 A1* | 4/2014 | Gopakumar | G06F 11/1076 714/6.2 |
| 2014/0244343 A1* | 8/2014 | Wilson | G06Q 10/0635 705/7.28 |
| 2014/0244362 A1 | 8/2014 | Chaudhury | |
| 2014/0278730 A1* | 9/2014 | Muhart | G06Q 10/0635 705/7.28 |
| 2014/0310714 A1 | 10/2014 | Chan et al. | |
| 2014/0358357 A1 | 12/2014 | Jones et al. | |
| 2015/0046756 A1* | 2/2015 | Sreekumaran | G06F 11/008 714/47.2 |
| 2015/0052406 A1 | 2/2015 | Garrett et al. | |
| 2015/0067153 A1* | 3/2015 | Bhattacharyya | H04L 43/04 709/224 |
| 2015/0074055 A1 | 3/2015 | Jacoby et al. | |
| 2015/0074452 A1* | 3/2015 | Tsukahara | G06F 3/0619 714/6.23 |
| 2015/0074462 A1 | 3/2015 | Jacoby | |
| 2015/0074463 A1 | 3/2015 | Jacoby et al. | |
| 2015/0074467 A1 | 3/2015 | Jacoby | |
| 2015/0135033 A1* | 5/2015 | Ellis | G06F 11/1048 714/763 |
| 2015/0277804 A1 | 10/2015 | Arnold et al. | |

OTHER PUBLICATIONS

Anderson, D., et al., "More than an interface—SCSI vs. ATA," *Proceedings of the 2nd Annual Conference on File and Storage Technology (FAST '03)*, pp. 1-13 (Mar. 2003).

Cole, G., "Estimating Drive Reliability in Desktop Computers and Consumer Electronics Systems," *Seagate Technology Paper TP-338.1*, pp. 1-8, (Nov. 2000).

Yang, J., et al., "A Comprehensive Review of Hard-Disk Drive Reliability," *Proceedings of the Annual Symposium on Reliability and Maintainability*, pp. 403-409 (Jan. 1999).

Hughes, G.F., et al., "Improved Disk-Drive Failure Warnings," *IEEE Transactions on Reliability*, 51(3): 350-357 (Sep. 2002).

Murray, J.F., et al., "Machine Learning Methods for Predicting Failures in Hard Drives: A Multiple-Instance Application," *J. Machine Learning Research*, 6: 783-816 (May 2005).

Wilcoxon, F., "Individual Comparison by Ranking Methods," *Biometrics Bulletin*, 1(6): 80-83 (1945); http://www.jstor.org, pp. 80-83 (Dec. 18, 2006).

Pinheiro, E., et al., "Failure Trends in a Large Disk Drive Population," *Proceedings of the 5th USENIX Conference on File and Storage Technologies (FAST '07)*, (Feb. 2007).

Anderson, D., et al., "More Than an nterface—SCI vs. ATA," *Proceedings of the 2nd USENIX Conference on File and Storage Technologies (FAST '03)*, pp. 1-12 (Mar. 2003).

\* cited by examiner

| MEMBER NAME | RAID TYPE | FREE SPACE | CONTROLLER TYPE | ARRAY FIRMWARE | MODEL | DRIVE FIRMWARE | SIZE | TYPE | RANDOM READS | SEQUENTIAL READS |
|---|---|---|---|---|---|---|---|---|---|---|
| A | 50 | 46 | 11 | V5.2.2 | MODEL: MBF2300RC | PA03 | 279.4GB | SAS | 3.8E+08 | 2.38E+08 |
| B | 5 | 36 | 7 | V5.2.1 | MODEL: ST31000524NS | KD03 | 931.5GB | SATA | 1978000 | 2847000 |
| ... | | | | | | | | | | |
| Y | 6 | 8 | 10 | V5.2.0 | MODEL: ST31000524NS | KD03 | 931.5GB | SATA | 8835000 | 7105000 |
| Z | 50 | 33 | 4 | V5.0.8 | MODEL: ST3400755SS | ERCA | 372.5GB | SAS | 276 | 339 |

| FIG. 5A | FIG. 5B |

FIG. 5

| RANDOM WRITES | SEQUENTIAL WRITES | SERIAL NUMBER | LOCATION | USAGE | KB DATA TRANSFERRED PER disk/day | DISK MODIFIER USAGE | RISK LEVEL |
|---|---|---|---|---|---|---|---|
| 1.01E+09 | 2.93E+08 | | | NORMAL USAGE | 72268321 | 72268321 | LOW |
| 3637000 | 2.988E+06 | | | NORMAL USAGE | 81310538 | 406552690 | MODERATE |
| 2568000 | 2.973E+06 | | | NORMAL USAGE | 49098486 | 245492430 | LOW+ |
| 40 | 2 | | | NORMAL USAGE | 4632483 | 4632483 | HIGH |

552 ↗

550

FROM FIG. 5A

FIG. 5B

SAN VULNERABILITY ASSESSMENT TOOL

RELATED APPLICATION(S)

This application is a continuation-in-part of U.S. application Ser. No. 14/024,454 filed on Sep. 11, 2013. The entire teachings of the above application are incorporated herein by reference.

BACKGROUND OF THE INVENTION

The increased use of technology and computers has generated a corresponding increase in digital data. This ever-increasing digital data requires a corresponding ever-increasing amount of storage space.

The need for storage space for digital data has been fueled through many changes in society. For example, home computer users increased storage of multimedia data, especially video and photographic data, has served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

With this increase of digital data, there has been a corresponding further reliance upon the integrity and required accessibility of the digital data. While storage device reliability has increased, these devices have not become infallible.

SUMMARY OF THE INVENTION

Thus, an efficient and reliable method for assessing storage device vulnerability is needed. The present invention is directed to a method and corresponding apparatus for assessing storage device vulnerability to data unavailability (DU) and/or data loss (DL). An embodiment of the method of the present invention begins by obtaining data for at least one storage device, the data including static and dynamic factors. Next, a risk score is calculated for the at least one storage device based on the obtained data. Finally, the risk score is presented to a user.

According to a further embodiment of the present invention, the obtained data may include storage device configuration information. In such an embodiment, the obtained data may comprise at least one of: Redundant Array of Independent Disk (RAID) data, live disk reliability data, disk array firmware version information, and disk drive firmware version information. In yet another embodiment of the present invention, the RAID data comprises at least one of: RAID type, a number of RAID sets, a number of disks per RAID set, a total number of disks, a number of spare disks, storage device size, storage device speed, and storage device class. Yet further still, in another embodiment of the method the live disk reliability data comprises at least one of: storage device class, storage device size, storage device speed, storage device model, and storage device usage.

In an embodiment of the method of the present invention, the storage device class comprises at least one of: Serial Attached Small Computer System Interface (SAS), Parallel Advance Technology Attachment (PATA), Serial Advance Technology Attachment (SATA), and Solid State Drive (SSD). The storage device usage may comprise at least one of: usage amount, usage type, amount of power on hours, amount of sequential usage, amount of random access usage, a number of reads, a number of writes, a grown defect list, a read error rate, a size of one or more reads, and a size of one or more writes. In another embodiment of the present invention, the method further comprises associating a high, medium, or low risk score indicator with the at least one storage device based upon the calculated risk score. In yet another embodiment of the present invention, the method further comprises associating a high-plus, high, high-minus, medium-plus, medium, medium-minus, low-plus, low, or low-minus risk score indicator with the at least one storage device based upon the calculated risk score.

In another embodiment of the present invention, the method further comprises obtaining diagnostic logfile data based upon one or more hardware or software characteristics of the at least one storage device. The calculated risk score of the at least one storage device may be modified using the obtained diagnostic logfile data.

In yet another embodiment of the method of the present invention, the storage device may comprise two or more storage devices. The method for each of the two or more storage devices may obtain respective data for each storage device including static and dynamic factors. The method may calculate a risk score for each storage device based on the respective obtained data. In addition, the method may present the risk score for each storage device to a user.

A further embodiment of the present invention is directed to an information handling system (IHS). An embodiment of the IHS comprises a data module configured to obtain data for at least one storage device, the data including static and dynamic factors, a computing module communicatively coupled to the data module and configured to calculate a risk score for the at least one storage device based on the obtained data, and a display module configured to present the risk score to a user.

According to an embodiment of the IHS, the obtained data may include device configuration information. The obtained data may comprise data of at least one of: Redundant Array of Independent Disk (RAID) data, live disk reliability data, disk array firmware version information, and disk drive firmware version information.

In an embodiment of the IHS, the RAID data may comprise at least one of RAID type, a number of RAID sets, a number of disks per RAID set, a total number of disks, a number of spare disks, storage device size, storage device speed, and storage device class. The live disk reliability data may comprise at least one of: storage device class, storage device size, storage device speed, storage device model, and storage device usage. The storage device class may comprise at least one of: Serial Attached Small Computer System Interface (SAS), Parallel Advance Technology Attachment (PATA), Serial Advance Technology Attachment (SATA), and Solid State Drive (SSD). The storage device usage may comprise at least one of: usage amount, usage type, amount of sequential usage, amount of power on hours, amount of random access usage, a number of reads, a number of writes, a grown defect list, a read error rate, a size of one or more reads, and a size of one or more writes.

In another embodiment of the IHS, the computing module may be further configured to associate a high, medium, or low risk score indicator with the at least one storage device based upon the calculated risk score. In yet another embodiment of the IHS, the data module may be further configured to obtain diagnostic logfile data based upon one or more hardware or software characteristics of the at least one storage device, and the computing module may be further configured to modify the calculated risk score of the at least one storage device using the obtained diagnostic logfile data.

In another embodiment of the IHS, the at least one storage device comprises two or more storage devices. For each of the two or more storage devices, the data module may be further configured to obtain respective data for each storage device, the data including static and dynamic factors. In addition, for each of the two or more storage devices, the computing module may be further configured to calculate a risk score for each storage device based on the respective obtained data. Finally, for each of the two or more storage devices, the display module may be further configured to present the risk score for each storage device to a user.

An alternative embodiment of the invention is directed to a non-transitory computer readable medium having stored thereon a sequence of instructions which, when loaded and executed by a processor coupled to an apparatus, causes the apparatus to: obtain data for at least one storage device, the data including static and dynamic factors, calculate a risk score for the at least one storage device based on the obtained data, and present the risk score to a user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5, FIGS. 5A-5B depicts a database entry of data that may be used in an embodiment of the present invention.

DETAILED DESCRIPTION OF THE INVENTION

A description of example embodiments of the invention follows.

Larger capacity drives are becoming more common. The larger drives have more blocks and therefore a longer rebuild time. RAID performance and availability may be directly affected during drive rebuild and reconstruction. RAID reconstruction times may increase substantially as physical drive sizes increase, increasing the potential for a second drive failure during reconstruction and thus increasing vulnerability of the data on the array. The RAID choices of previous years may no longer be safe with these larger capacity drives. Each RAID type has different performance and resiliency characteristics and it is difficult for customers to make good choices regarding their SAN environment. The issue of assessing vulnerability becomes even more challenging because some bugs/failures do not present themselves for long periods of time, so it may be difficult for customers to be aware of the true level of vulnerability to data loss or data unavailability.

Although approaches exist to improve RAID performance, these existing approaches fail to provide tools/solutions for determining how risky a particular RAID type may be. Further, these existing approaches fail to provide a risk analysis for a particular RAID type based on parameters, such as number of drives, size, speed of drives, and other various characteristics. Thus, embodiments of the present invention are directed to methods and corresponding systems that use various characteristics to assess storage device vulnerability to data unavailability (DU) or data loss (DL).

The present invention examines array diagnostics and generates a risk assessment profile based on various criteria. Key criteria may include the size of the drives, the number of drives, the RAID type selected, the number of spares, the speed and class (SATA, SAS, or SSD) of the drives, and a drive quality modifier (based on dispatch statistics). By analyzing a user's storage array, the present invention enables a user to determine if the user is at a higher risk for a multiple faults based on the user's configuration choices.

Figure 1:
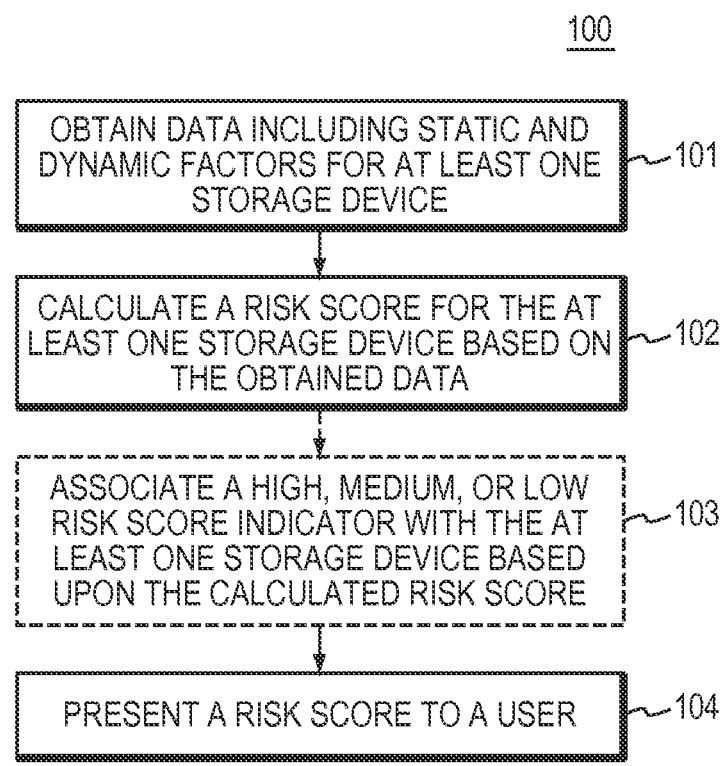
FIG. 1 is a flowchart of a method of assessing storage device vulnerability to data unavailability or data loss according to an embodiment of the invention.

FIG. 1 is a flow diagram of a method 100 of assessing storage device vulnerability according to the principles of the present invention. The method 100 begins by obtaining data for at least one storage device, including static and dynamic factors (101). Next, a risk score is calculated for the at least one storage device based on the obtained data (102). The calculation step (102) of the present invention also uses a set of mathematical formulas that it applies to the obtained data to obtain the risk score. Optionally, a risk score indicator, such as high, medium, low, (and high-plus, medium-plus, low-plus, high-minus, medium-minus, or low-minus) is associated with the at least one storage device based upon the calculated risk score (103). Finally, a risk score is presented to a user (104).

The method 100 begins by obtaining data for at least one storage device, including static and dynamic factors (101). The data may be obtained from any source that is known in the art. For example, in an embodiment wherein the method 100 is being carried out on a computer system, the data may be obtained from any point that is communicatively coupled to the computer system. For example, the data may be communicated to an apparatus performing the method 100 via a local area network (LAN) and/or a wide area network (WAN). Yet further still, in an example embodiment of the method 100, wherein the method 100 is being carried out on a computing device, the data may be obtained by loading the data directly on the computing device. Alternatively, the data may be obtained from any storage device that is known in the art that is communicatively coupled to the computing device carrying out the method 100. In an alternative embodiment of the method 100 that is operating in a computer network environment, such as a server/client environment, the data regarding static or dynamic factors of the storage device may be obtained by the server running the method 100 from a communicatively coupled client computer. Further, in such an environment, an embodiment may be carried out on a client computer and the data may be obtained from a communicatively coupled client, server, or any combination thereof.

The obtained data may comprise any data regarding static or dynamic factors of the storage device as is known in the art. For example, in an embodiment of the method 100, the obtained data includes device configuration information. In such an embodiment, the obtained data may include Redundant Array of Independent Disk (RAID) data, live disk reliability data, disk array firmware version information, and/or disk drive firmware version information.

The RAID data may comprise RAID type, a number of RAID sets, a number of disks per RAID set, a total number of disks, a number of spare disks, storage device size, storage device speed, and/or storage device class. The live disk reliability data (also known as a drive quality modifier, or field data) may comprise the storage device class, storage device size, storage device speed, storage device model, and/or storage device usage. The disk reliability data may be obtained and modified in a "live" manner. The firmware information may comprise version information of the disk drive and disk array.

According to an example embodiment, the obtained data may further include information related to the interface type of the storage device. The storage device class may include interface types as are known in the art, including SATA (Serial Advance Technology Attachment), PATA (Parallel ATA), SCSI (Small Computer System Interface), and/or SAS (Serial Attached SCSI) interfaces. The storage device usage may comprise usage amount, usage type, amount of power on hours, amount of sequential usage, amount of random access usage, a number of reads, a number of writes, a grown defect list, a read error rate, a size of one or more reads, and a size of one or more writes. Further, an embodiment of the present invention may obtain any combination of data regarding static or dynamic factors as described herein.

While example embodiments of the method 100 are described hereinabove as using a number of read or writes, this number may be any number which may be derived from static and dynamic factors of the storage device. For example, an average number of reads and writes may be used. Further still, all of the aforementioned obtained data may be pre, or post processed, such that the obtained data is not pure, raw, for the static and dynamic factors, but may be, for example, an average. Yet further still, embodiments of the method 100 may obtain any combination of any of the data regarding static and dynamic factors of the storage device and device configuration information as described herein or as known in the art.

After obtaining data (101), the method 100 next calculates a risk score for the at least one storage device (102) based on the obtained data. As mentioned hereinabove, the obtained data may comprise Redundant Array of Independent Disk (RAID) data, live disk reliability data, disk array firmware version information, and disk drive firmware version information. The method uses the obtained data and a set of mathematical equations to calculate a risk score. Using the obtained data, and the equations, the method defines how long the rebuild window is, the chance of a multiple faults, and the level of vulnerability of the storage device to data unavailability of data loss. The mathematical equations used are dynamic, and, as such, may be refined as further obtained data is received such as fault information.

In step 103, the method 100 may associate a risk score indicator with the at least one storage device based upon the calculated risk score. In one embodiment, the risk score indicator may be high, medium, or low. In another embodiment, the risk score indicator may be high-plus, high, high-minus, medium-plus, medium, medium-minus, low-plus, low, or low-minus. The risk score indicator may be the words, high, medium, or low, or any other risk score indicator as is known in the art. For example, colors may be used to indicate a risk score wherein, red, yellow, and green are equated with high, medium, and low respectively. Similarly to embodiments of the method 100 described hereinabove, the risk score indicators determined in step 103 of the method 100 may be communicated and/or outputted from the method 100. Further, according to an alternative embodiment of the method 100, the risk score indicators may be any indication of the likelihood of risk to vulnerability of data loss or data unavailability as is known in the art and are not limited to being that of high, medium, and low. For example, in an embodiment of the method 100, a numerical scale is used to indicate the risk score.

In step 104, the risk score may be presented (through a display, report, or other means) to the user. According to an embodiment of the method 100, the risk score may be presented at each step, 101-104, of the method 100. For example, after the risk score of the at least one storage device is calculated (102), the risk score may be presented to a user of the storage device or a user executing the method 100. Further, in an example embodiment, any presentation of the risk score from the method 100 may be in the form of an email report, electronic notification, graphical display, or any form of communication as is known in the art.

Figure 2:
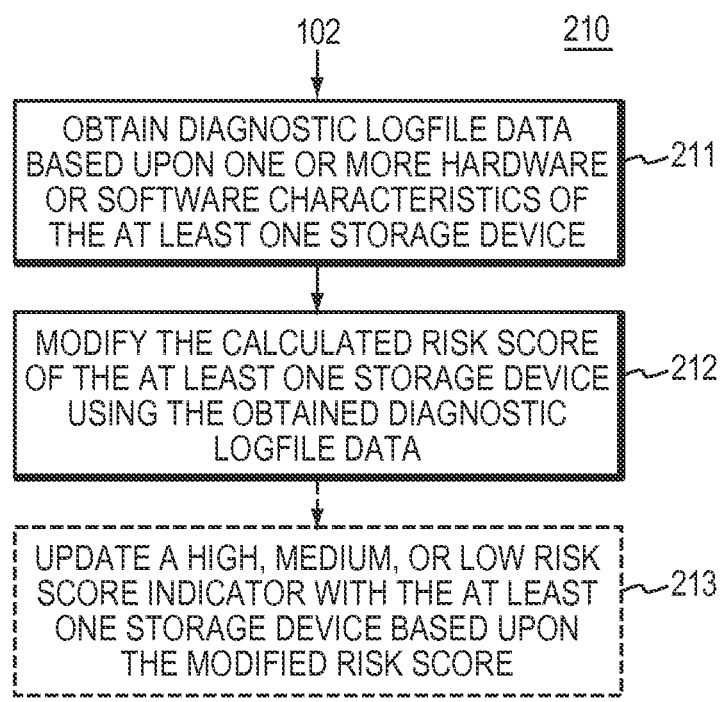
FIG. 2 is a flowchart of a method of assessing storage device vulnerability using diagnostic logfile data according to an embodiment of the invention.

FIG. 2 illustrates a method 210 of assessing storage device vulnerability according to an embodiment of the present invention. The method 210 may be a continuation of the method 100 described hereinabove in relation to FIG. 1 and may proceed from step 102 and/or step 103 of the method 100. Further, the method 210 may receive as input, the risk score calculated in step 102 and/or the risk score indicator determined in step 103 of the method 100.

The method 210 begins by obtaining diagnostic logfile data which is based upon one or more hardware or software characteristics of the least one storage device (211). Next, the risk score of the at least one storage device is modified using the obtained diagnostic logfile data (212).

While the method 210 is described as a continuation of the method 100, i.e., the method 210 comprises modifying the risk score calculated in step 102 of the method 100, according to an alternative embodiment of the present invention, the methods 100 and 210 may be carried out together, such that the initial calculation of the risk score considers both the diagnostic logfile data and obtained data including static and dynamic factors. In such an embodiment, the method begins by obtaining data including static and dynamic factors of the at least one storage device and diagnostic logfile data based upon one or more hardware or software characteristics of the at least one storage device. Next, storage device vulnerability is assessed using both the diagnostic logfile data and the obtained data including static and dynamic factors of the at least one storage device. In this manner, rather than modifying the calculated risk score in step 212 of the method 210, the original calculation of the risk score accounts for the diagnostic logfile data.

In an alternative embodiment of the method 210, the method further comprises modifying the risk score indicator associated with the at least one storage device using the diagnostic logfile data (213). In such an embodiment, the risk score indicator is modified to be one of high-plus, high, high-minus, medium-plus, medium, medium-minus, low-plus, low, or low-minus.

Further, in another example embodiment of the present invention, the original step of associating a risk score indicator with the risk score, as in step 103 of the method 100, may account for diagnostic logfile data, and thus, the originally associated risk score indicator may be one of high-plus, high, high-minus, medium-plus, medium, medium-minus, low-plus, low, or low-minus. Further, the modified risk score indicator may be a modified version of any risk score indicator described herein.

According to an embodiment of the method 210, the diagnostic logfile data that is based upon one or more hardware or software characteristics of the least one storage device may comprise Redundant Array of Independent Disk (RAID) data, live disk reliability data, disk array firmware version information, and/or disk drive firmware version information.

For example, a storage device class (a non-limiting example of live disk reliability data) may refer to whether the storage device is a solid state device (SSD) or a traditional spinning magnetic storage device. Further, according to an example embodiment of the present invention, the diagnostic logfile data may be a known threshold at which storage devices degrade. For example, storage devices, depending on any number of factors, including drive quality, may degrade when the storage device experiences an extremely high workload. Thus, in an example embodiment of the present invention, the risk score indicator is modified in step 212 of the method 210 when more than a given threshold of data is written to the at least one storage device.

An alternative embodiment of the present invention is directed to a method for calculating the risk score of multiple storage devices. In such an embodiment of the invention, the risk score may be calculated for any number of storage devices. For example, an embodiment of the present invention is directed to calculating the risk score of two disks in a RAID storage device. Such an embodiment may be especially helpful where the RAID system is unable to provide data back-up if there are two or more device failures. In such an example embodiment, an embodiment of the present invention may be used to ensure that a storage device is replaced if it is determined that there is a high risk score for two or more disks in the RAID set.

In an embodiment of the invention directed to calculating a risk score for multiple storage devices, the method begins by obtaining respective data regarding static and dynamic factors of the storage devices. Next, the risk score is calculated for each storage device based upon the obtained data. Finally, a risk score for each storage device is presented to a user.

While an embodiment of the present invention comprises obtaining respective data regarding static and dynamic factors of the storage devices, an alternative embodiment does not require obtaining respective static and dynamic factors. For example, wherein the storage device is a RAID storage device and thus comprises multiple independent disks, static and dynamic factors for the entire RAID storage device may be obtained and then processed using the known RAID configuration to determine the respective static and dynamic factors of the independent disks that comprise the RAID storage device.

Similar to the embodiments of the methods described hereinabove, a method of the present invention, wherein the storage device comprises two or more storage devices, may comprise obtaining diagnostic logfile data of the storage device which is based upon one or more hardware or software characteristics of the storage device. Further, another example embodiment of the present invention comprises modifying the respective risk score for the two or more storage devices using the obtained diagnostic logfile data. Yet further still, as described hereinabove, an embodiment of the present invention may begin by obtaining both static and dynamic factors of two or more storage devices and diagnostic logfile data of the two or more storage devices. Next, a respective risk score of the two or more storage devices is calculated using both the obtained data for static and dynamic factors and the obtained diagnostic logfile data.

Figure 3:
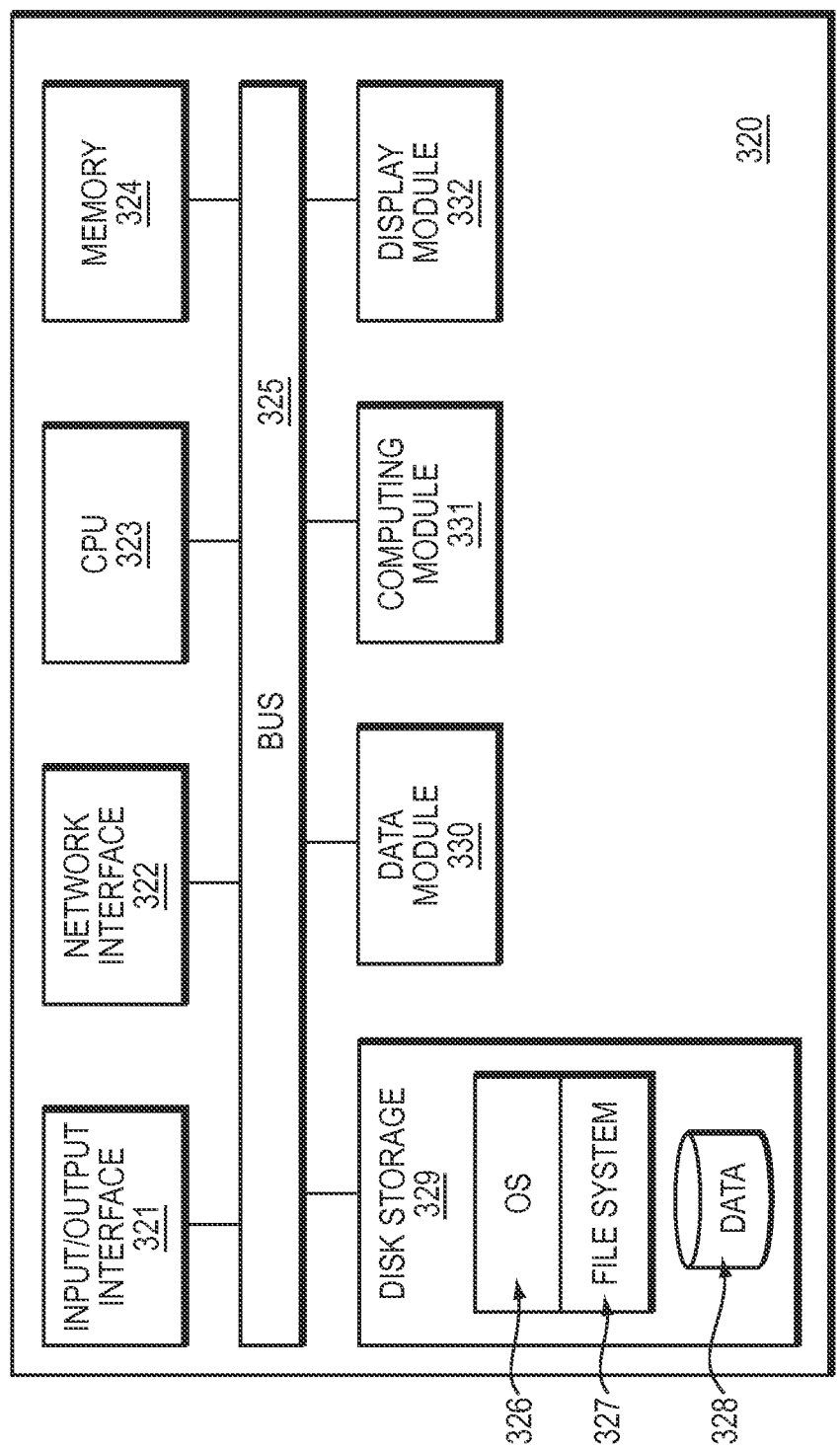
FIG. 3 is a simplified block diagram of an Information Handling System (IHS) configured to assess storage device vulnerability.

FIG. 3 is a high level block diagram of an information handling system (IHS) 320 that is configured to assess storage device vulnerability to data unavailability or data loss. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Coupled with the OS 326, is the file system 327. Disk storage 329 may be any storage device known in the art.

The IHS 320 further comprises a data module 330. According to an embodiment of the IHS 320, the data module 330 is configured to obtain data regarding static and dynamic factors of at least one storage device. The data obtained by the data module 330 may be any data as described herein. The data module 330 may obtain the data from any communicatively coupled source. For example, the data module 330 may obtain the data from the storage device 329 or via the input/output interface 321 or network interface 322.

Communicatively coupled to the data module 330 is the computing module 331. The computing module 331 is configured to calculate a risk score for the at least one storage device based on the obtained data from the data module 330 and mathematical formulas of the present invention. The formulas may be obtained from any communicatively coupled source, including, but not limited to, the computing module 331, the network 322, from the input/output interface 321, the memory 324, or from disk storage 329. The IHS 320 further comprises a display module 332. The display module 332 is configured to present the risk score to a user.

The IHS 320 and its various components and modules work in conjunction to assess storage device vulnerability. According to an example operation of the IHS 320, the data module 330 obtains data regarding static and dynamic factors of at least one storage device, such as a storage device communicatively coupled to the IHS 320 via the network interface 322. Next, the computing module 331 determines a risk score of the at least one storage device. Finally, the display module 332 presents the risk score to the user.

While the various components of the IHS 320 are illustrated in FIG. 3, embodiments of the IHS 320 are not so limited, and as is known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or OS 326 operated on by CPU 323. Further, the IHS 320 and its various components and modules may be configured to operate in a manner corresponding to the above described methods 100 and 210 described herein above in relation to FIGS. 1 and 2 and its various embodiments.

Further, the IHS 320 and its various modules may be configured to perform any of the various methods described hereinabove. For example, in an embodiment of the IHS 320, the computing module 331 is configured to associate a high, medium, or low risk score indicator with the at least one storage device based upon the calculated risk score. In another example embodiment of the IHS 320, the data module 330 is configured to obtain diagnostic logfile data based upon one or more hardware or software characteristics of the at least one storage device. In such an embodiment, the computing module 331 is further configured to modify the calculated risk score of the at least one storage device using the obtained diagnostic logfile data. In yet another embodiment of the IHS 320, the computing module 331 is configured to modify the associated risk score indicator of the at least one storage device to be one of high-plus, high, high-minus, medium-plus, medium, medium-minus, low-plus, low, or low-minus using the diagnostic logfile data.

Further embodiments of the IHS 320 may be configured to assess storage device vulnerability to data unavailability or data loss for two or more storage devices. In such an embodiment, the data module 330 is configured to obtain respective data for each storage device, the data including static and dynamic factors, and the computing module 331 is configured to calculate a risk score for each storage device based on the respective obtained data. The display module 332 may be further configured to present the risk score for each storage device to one or more users.

Figure 4:
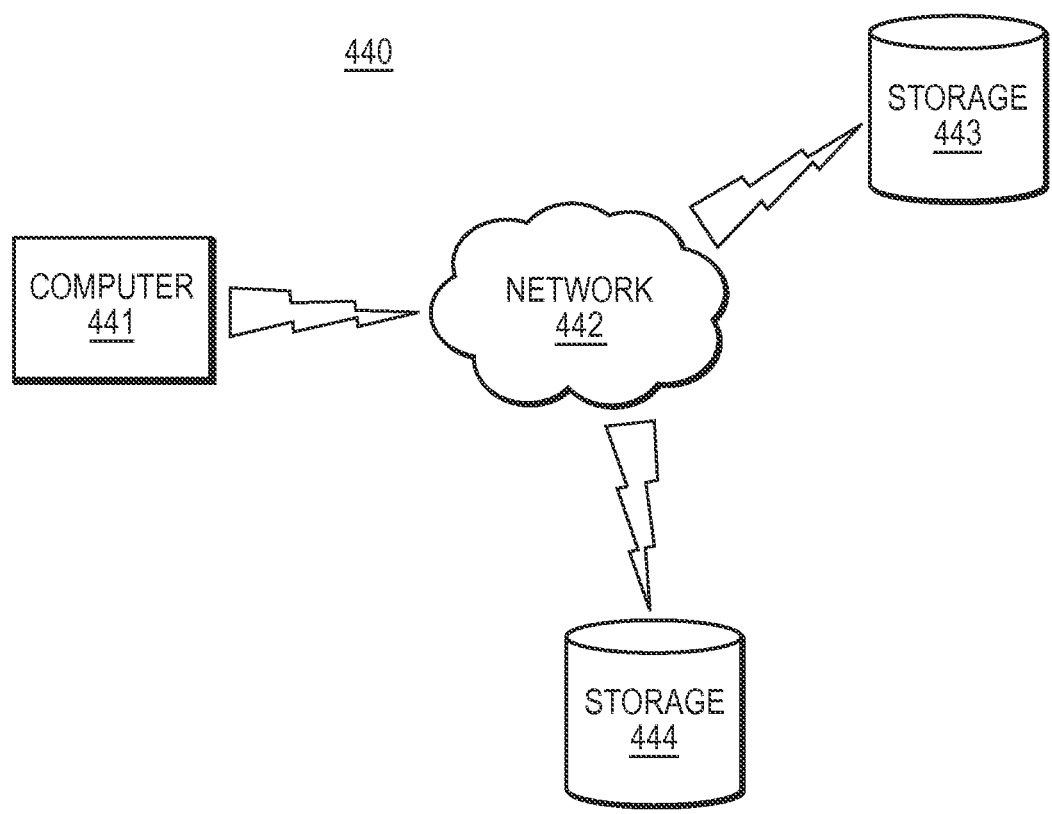
FIG. 4 depicts a computer network environment in which an embodiment of the present invention may be implemented.

FIG. 4 illustrates a computer network environment 440 in which the present invention may be implemented. The computer 441 and the storage devices 443 and 444 are linked through network 442. The computer 441 and the storage devices 443 and 444 may be connected through any network as is known in the art, including a wide area network (WAN) or local area network (LAN). The computer 441 may embody the IHS 320 and/or any embodiment of the IHS described herein. Similarly, the computer 441 may be configured to carry out any method or embodiment thereof described herein. According to an embodiment of the invention, the computer 441 is configured to assess vulnerability of the storage device 443 and 444 to data unavailability or data loss. While only two storage devices are depicted, 443 and 444, the computer network environment 440 may comprise any number of storage devices.

FIG. 5 is an example of data 550 that may be used in an embodiment of the present invention. The row 551 of the data 550 is a non-limiting example of the types of data that may comprise the data obtained, for example, in step 101 of the method 100 as described hereinabove in relation to FIG. 1. Further, the row 551 may also comprise diagnostic logfile data that may be obtained in step 211 of the method 210. Further still, in the data 550, the last column 552, of the data 550 comprises the assessed risk level. In an embodiment of the invention, the assessed risk level 552 may be equated with the risk score determined in step 102 and/or 103 of the method 100. The column 552 may be populated after completing any embodiment of the invention described herein. For example, after completing step 213 of the method 210, the column 552 may be populated with the result of step 213.

For a non-limiting example, an example embodiment applies to the data 550 the following mathematical relationships (or equations), where R is a risk score:

RAID configurations (RC). If 'RAID Type' ∈ {known problematic ones}

AND/'Size'/∈ Range 1: Set $R_1$ low

∈ Range 2: Set $R_1$ med

AND/'Free Space'/≤% Size: Set $R_1$=$R_1$+

>% Size: Set $R_1$=$R_1$−

Then Risk Score$_{RC}$:=$R_1$

Disk Reliability (DR). If 'Disk Model' problematic

Class/Type ∈ Range 3: Set $R_2$=$R_2$+else Set $R_2$=$R_2$−

Size ∈ Range 4: Set $R_2$=$R_2$+else Set $R_2$=$R_2$−

Speed ∈ Range 5a: Set $R_2$=$R_2$+else Set $R_2$=$R_2$−

Usage ∈ Range 5b: Set $R_2$=$R_2$+else Set $R_2$=$R_2$−

AND/'Random Reads' ∈ Range 6: Set $R_2$=$R_2$+else Set $R_2$=$R_2$−

'Sequential Reads' ∈ Range 7: Set $R_2$=$R_2$+else Set $R_2$=$R_2$−

'Random Writes' ∈ Range 8: Set $R_2$=$R_2$+else Set $R_2$=$R_2$−

'Sequential Writes' ∈ Range 9: Set $R_2$=$R_2$+else Set $R_2$=$R_2$−

Then Risk Score$_{DR}$: =$R_2$

Firmware Risk (FMW). If 'Array Firmware' ∈ {problem versions}

Then set $R_3$:=$R_3$+

If 'Drive Firmware' ∈ {problem versions}

Then set $R_3$:=$R_3$+

Risk Score$_{FMW}$:=$R_3$

Total Risk Score=$K1*R_1+K2*R_2+K3*R_3$

RAID risk score may affected by disk size and free space relative to disk size, and other factors. Disk reliability risk score may be affected by class/type, size, speed, usage, random reads, sequential reads, random writes, sequential writes, or other factors. Firmware risk score may be affected by the version of array firmware and version of drive firmware. RAID risk score, Disk reliability risk score, and Firmware risk score may incorporate other factors in arriving at their respective risk score indications. In addition, constants K1, K2, and K3 may be applied to each corresponding risk score, to further modify the total risk score, resulting in a total risk score indication of high-plus, high, high-minus, medium-plus, medium, medium-minus, low-plus, low, or low-minus.

The data 550 may be stored according to any method known in the art. For example, the data 550 may be stored in a database communicatively coupled to a computing device configured to carry out an embodiment of the present invention.

In one embodiment of the invention, in order to determine risk scores, the present invention first determines the probability of drive failure for DU or DL. To determine drive failure probability, e.g. how vulnerable a SAN is to a DU (or DL) event due to a multiple drives failing, the present invention first determines what is the likelihood of a single failure. After a drive fails, there may be a window of vulnerability in which a second drive might fail. Depending on a customer's RAID choices, that second failure might cause a DU event.

The following parameters may be used to determine the probability of drive failure. However, one skilled in the art realizes that one may use other parameters and modify constant values shown below in order to arrive at a drive failure probability.

R=Modifier based on speed and class of drive (as a non-limiting example, baseline of 7200 RPM)

S=Modifier based on the size of the drive (as a non-limiting example, baseline of 1 TB)
T=Number of disks per RAID set
U=Modifier based on disk reliability data
V=Modifier based on array firmware enhancements
W=RAID modifier that indicates how many drives must fail within a RAID set to trigger a DU event
X=Expected drive failure rate (as a non-limiting example, baseline may be 1% per/year, assuming a linear increase of 1% per year for years 2-3, and 2% increase for years 4-5)
Y=Variance from the norm for a specific drive model (taken from dispatch rates, as a non-limiting example, a drive might fail at 0.5% per year, 3% per year, etc.)
Z=Number of active drives in an array In one non-limiting example embodiment, a probability of a single failure is roughly $X*Y*Z$; ($0.01*1*100$ or one drive failure per year for a typical drive in a 100 drive array). In another non-limiting example embodiment, a baseline of a 1 TB drive at 7200 RPM under a normal IO load, a drive may take 1 day to rebuild in which a second failure may cause a DU event. If all 100 drives are in the same RAID set, the likelihood of a second failure during the rebuild window is about ($0.01*99/365$ or about 0.27% chance for a DU event).

In another non-limiting example embodiment, assuming a four year old array with 2 TB drives and a 2X variance, running RAID 5 in a 16 drive system with 1 spare, the present invention may expect a failure rate of $2*0.05*15$ (or 1.5 drives per year). The rebuild for a 2 TB drive may have roughly twice the time of a 1 TB drive, meaning the vulnerable window is approximately 2 days for a second failure; $(2*0.05*14)*(2/365)=0.7\%$ chance for a DU event.

It also should be understood that these examples are non-limiting, and the present invention may include more or less parameters, which may be arranged differently, or represented differently, for determining the chance of a DU event. In addition, the present invention may utilize newer array firmware in order to mirror a failing drive, and may thus remove the risk failure window in some cases.

Figure 6:
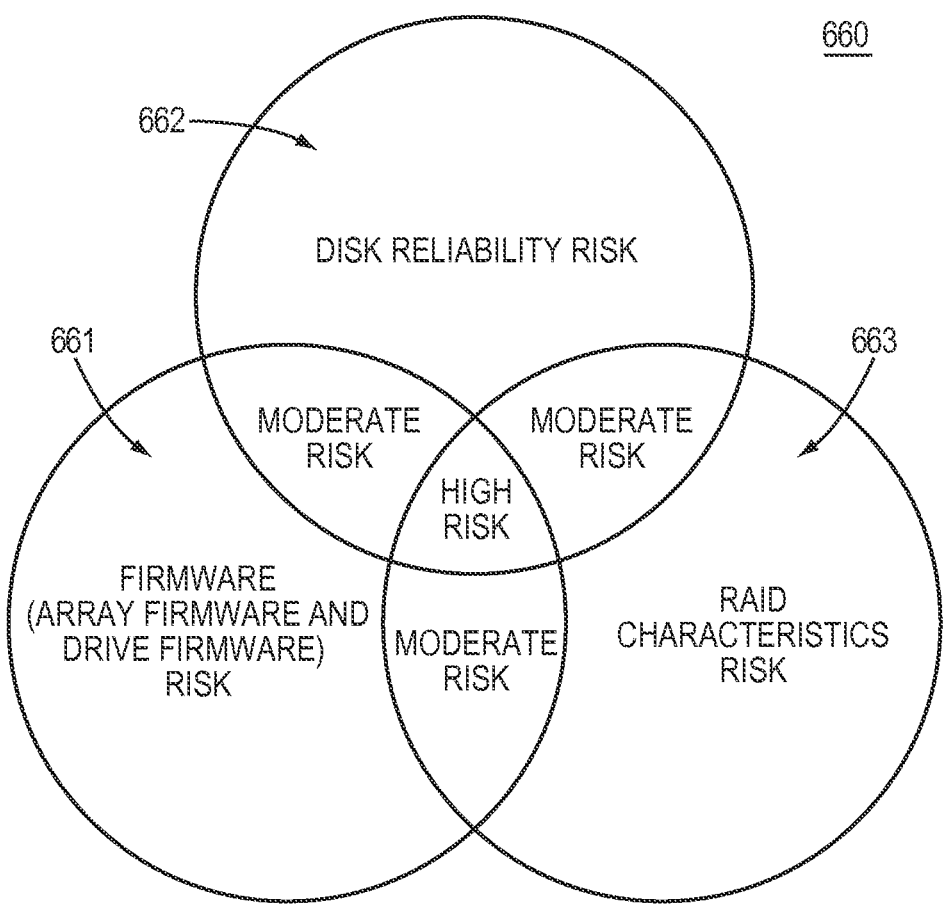
FIG. 6 illustrates categories that an embodiment of the present invention may consider when assessing storage device vulnerability, including factors applicable to storage device vulnerability.

FIG. 6 illustrates categories and their relation in a diagram 660 that embodiments of the present invention may consider when assessing storage device vulnerability to data unavailability or data loss. Embodiments of the present invention may consider categories including firmware risk 661 (such as, but not limited to, array firmware and drive firmware), disk reliability risk 662, and RAID characteristics risk 663. Embodiments of the invention may consider any of the categories 661, 662, and/or 663 alone or in combination to assess storage device vulnerability to DL or DU.

In an example embodiment of the present invention, RAID characteristics risk 663 may be considered indicative of storage device resiliency. For example, embodiments of the present invention may consider the storage device vulnerability as high based upon the RAID configuration alone, for example, where the particular RAID configuration is unable to recover data in the event of even a single device failure. Further, a storage device may be considered to be in moderate risk as shown in the diagram 660 where both the disk reliability risk 662 is high and RAID characteristics warrant. In an example embodiment of the present invention, when a storage device has both a high disk reliability risk (such as, but not limited to, a problem with class, size, speed, model, or usage of the storage device) and less than ideal RAID characteristics, for example, when data is unable to be recovered in the event of a single device failure, it may be associated with a high or medium-plus risk score indicator.

Further, embodiments of the present invention may also consider firmware 661. Again, as described hereinabove, firmware may pertain to any firmware characteristic as is known in the art, for example, the version or quality of the firmware, or whether bugs exist in the given version of firmware. The firmware risk 661 may pertain to array firmware, drive firmware, or both. According to an example embodiment of the present invention, the disk reliability risk 662 may be equated with the diagnostic logfile data described hereinabove.

The diagram 660 also depicts possible relations between the categories 661, 662, and 663. By way of a non-limiting example, an embodiment of the present invention may determine that a storage device is at moderate risk of DL or DU where both the firmware version has known issues and the RAID characteristics warrant. Further, as depicted in the diagram 660, a device may be consider to be at moderate risk of failure where disk reliability risk is high and firmware risk is low and/or where firmware risk is low and the RAID characteristics are less than ideal. Further still, an example embodiment of the present invention may determine that a storage device is at a high risk of failure where disk reliability risk is low, firmware risk is high, and RAID characteristics are less than ideal as depicted in the diagram 660.

It should be understood that the example embodiments described above may be implemented in many different ways. In some instances, the various methods and machines described herein may be implemented by a physical, virtual or hybrid general-purpose computer, or a computer network environment such as the computer network environment 440. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

An advantage of the present invention is that, as opposed to written guidance that may be provided to a SAN customer (through a technical report or other means), the present invention provides greater degrees of specificity and accuracy for determining storage device vulnerability. The present invention achieves this through the use of risk characteristics, such as, but not limited to, a number of drives, RAID sets, speed, size, quality, class of drives, and other such characteristics.

Another advantage of the present invention is that it increases customer satisfaction as it helps customers to make better choices between different RAID options. The present invention may be used to guide customers to avoid high risk choices and to reduce further risk if high risk choices have already been made. The present invention allows customers to reduce cost by reducing loss of data. When customers make better choices regarding their RAID selections, they reduce their likelihood of multiple drive faults. The present invention reduces technical support costs by reducing the number of customers experiencing lost data.

While this invention has been particularly shown and described with references to example embodiments thereof, it will be understood by those skilled in the art that various changes in form and details may be made therein without departing from the scope of the invention encompassed by the appended claims.

What is claimed is:

1. A method for assessing storage device vulnerability to data unavailability or data loss, the method comprising:
   obtaining data for at least one storage device, the data including static and dynamic factors regarding device operation and device characteristics;
   calculating a risk score for the at least one storage device based on the obtained data; and
   presenting the risk score to a user,
   wherein the obtained data comprises device configuration information and live disk reliability data.

2. The method of claim 1 wherein the obtained data further comprises Redundant Array of Independent Disk (RAID) data and one or more of:
   disk array firmware version information; and
   disk drive firmware version information.

3. The method of claim 2 wherein the RAID data comprises at least one of:
   RAID type;
   a number of RAID sets;
   a number of disks per RAID set;
   a total number of disks;
   a number of spare disks;
   storage device size;
   storage device speed; and
   storage device class.

4. The method of claim 2 wherein the live disk reliability data comprises at least one of:
   storage device class;
   storage device size;
   storage device speed;
   storage device model; and
   storage device usage.

5. The method of claim 4 wherein the storage device class comprises at least one of:
   Serial Attached Small Computer System Interface (SAS);
   Serial Advance Technology Attachment (SATA);
   Parallel Advance Technology Attachment (PATA); and
   Solid State Drive (SSD).

6. The method of claim 4 wherein the storage device usage comprises at least one of:
   usage amount;
   usage type;
   amount of power on hours;
   amount of sequential usage;
   amount of random access usage;
   a number of reads;
   a number of writes;
   a grown defect list;
   a read error rate;
   a size of one or more reads; and
   a size of one or more writes.

7. The method of claim 1 further comprising:
   associating a high, medium, or low risk score indicator with the at least one storage device based upon the calculated risk score.

8. The method of claim 1 further comprising:
   associating a high-plus, high, high-minus, medium-plus, medium, medium-minus, low-plus, low, or low-minus risk score indicator with the at least one storage device based upon the calculated risk score.

9. The method of claim 1 further comprising:
   obtaining diagnostic logfile data based upon one or more hardware or software characteristics of the at least one storage device; and
   modifying the calculated risk score of the at least one storage device using the obtained diagnostic logfile data.

10. The method of claim 1 wherein the storage device comprises two or more storage devices and the method for each of the two or more storage devices:
    obtains respective data for each storage device including static and dynamic factors regarding device operation and device characteristics;
    calculates a risk score for each storage device based on the respective obtained data; and
    presents the risk score for each storage device to a user.

11. An information handling system (IHS) comprising:
    a data module configured to obtain data for at least one storage device, the data including static and dynamic factors regarding device operation and device characteristics;
    a computing module communicatively coupled to the data module and configured to calculate a risk score for the at least one storage device based on the obtained data; and
    a display module configured to present the risk score to a user,
    wherein the obtained data comprises device configuration information and live disk reliability data.

12. The IHS of claim 11 wherein the obtained data further comprises Redundant Array of Independent Disk (RAID) data and one or more of:
    disk array firmware version information; and
    disk drive firmware version information.

13. The IHS of claim 12 wherein the RAID data comprises at least one of:
    RAID type;
    a number of RAID sets;
    a number of disks per RAID set;
    a total number of disks;
    a number of spare disks;
    storage device size;
    storage device speed; and
    storage device class.

14. The IHS of claim 12 wherein the live disk reliability data comprises at least one of:
    storage device class;
    storage device size;
    storage device speed;
    storage device model; and
    storage device usage.

15. The IHS of claim 14 wherein the storage device class comprises at least one of:
    Serial Attached Small Computer System Interface (SAS);
    Serial Advance Technology Attachment (SATA);
    Parallel Advance Technology Attachment (PATA); and
    Solid State Drive (SSD).

16. The IHS of claim 14 wherein the storage device usage comprises at least one of:
   usage amount;
   usage type;
   amount of power on hours;
   amount of sequential usage;
   amount of random access usage;
   a number of reads;
   a number of writes;
   a grown defect list;
   a read error rate;
   a size of one or more reads; and
   a size of one or more writes.

17. The IHS of claim 11 wherein the computing module is further configured to:
   associate a high, medium, or low risk score indicator with the at least one storage device based upon the calculated risk score.

18. The IHS of claim 11 wherein:
   the data module is further configured to obtain diagnostic logfile data based upon one or more hardware or software characteristics of the at least one storage device; and
   the computing module is further configured to modify the calculated risk score of the at least one storage device using the obtained diagnostic logfile data.

19. The IHS of claim 11 wherein:
   the at least one storage device comprises two or more storage devices; and
   for each of the two or more storage devices:
      the data module is further configured to obtain respective data for each storage device, the data including static and dynamic factors regarding device operation and device characteristics;
      the computing module is further configured to calculate a risk score for each storage device based on the respective obtained data; and
      the display module is further configured to present the risk score for each storage device to a user.

20. A non-transitory computer readable medium having stored thereon a sequence of instructions which, when loaded and executed by a processor coupled to an apparatus, causes the apparatus to:
   obtain data for at least one storage device, the data including static and dynamic factors regarding device operation and device characteristics;
   calculate a risk score for the at least one storage device based on the obtained data; and
   present the risk score to a user,
   wherein the obtained data comprises device configuration information and live disk reliability data.

* * * * *